US012452345B2

(12) United States Patent
Chen et al.

(10) Patent No.: US 12,452,345 B2
(45) Date of Patent: Oct. 21, 2025

(54) MANAGING ARTIFICIAL INTELLIGENCE INFERENCE REQUESTS THAT ARE DIRECTED TO AN AI MODEL EXTERNAL TO A DISTRIBUTED CLOUD COMPUTING NETWORK

(71) Applicant: CLOUDFLARE, INC., San Francisco, CA (US)

(72) Inventors: Michelle Chen, New York, NY (US); Dane Orion Knecht, Austi, TX (US); Celso Martinho, Lisbon (PT); Yoav Moshe, Amsterdam (NL); Simona Andreea Badoiu, Lisbon (PT)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 18/898,508

(22) Filed: Sep. 26, 2024

(65) Prior Publication Data
US 2025/0103744 A1    Mar. 27, 2025

Related U.S. Application Data

(60) Provisional application No. 63/585,593, filed on Sep. 26, 2023.

(51) Int. Cl.
| | |
|---|---|
| G06F 21/62 | (2013.01) |
| G06F 9/50 | (2006.01) |
| H04L 41/16 | (2022.01) |
| H04L 67/1014 | (2022.01) |
| H04L 67/63 | (2022.01) |

(52) U.S. Cl.
CPC .......... *H04L 67/63* (2022.05); *G06F 21/6218* (2013.01); *H04L 41/16* (2013.01); *H04L 67/1014* (2013.01); *G06F 9/5027* (2013.01)

(58) Field of Classification Search
CPC ...... G06N 20/00; G06N 5/04; G06F 21/6218; G06F 9/5027
See application file for complete search history.

(56) References Cited

U.S. PATENT DOCUMENTS

| | | | |
|---|---|---|---|
| 10,348,851 B1 * | 7/2019 | Cheung | H04L 65/80 |
| 11,373,119 B1 * | 6/2022 | Doshi | H04L 47/70 |
| 11,394,710 B1 * | 7/2022 | Royal | H04L 63/20 |

(Continued)

OTHER PUBLICATIONS

International Search Report and Written Opinion, PCT App. No. PCT/US2024/048719, Jan. 9, 2025, 15 pages.

*Primary Examiner* — Miranda M Huang
*Assistant Examiner* — Yao David Huang
(74) *Attorney, Agent, or Firm* — NICHOLSON DE VOS WEBSTER & ELLIOTT LLP

(57) ABSTRACT

A compute server of a distributed cloud computing network receives an inference request that is directed to an AI model hosted at a destination external to the distributed cloud computing network. The compute server determines that the inference request satisfies security rules associated with the AI model. Upon determining that the inference request is not answerable from a cache, the compute server transmits the inference request to the AI model hosted at the external destination. The compute server receives an inference response from the AI model in response to the inference request, transmits the inference response, and stores the inference request and the inference response in cache.

18 Claims, 6 Drawing Sheets

(56) References Cited

U.S. PATENT DOCUMENTS

| | | |
|---|---|---|
| 11,714,681 B2 | 8/2023 | Yang et al. |
| 11,726,999 B1* | 8/2023 | Vig .................. G06F 16/24552 |
| | | 707/718 |
| 11,755,381 B1 | 9/2023 | Hart et al. |
| 2018/0189674 A1* | 7/2018 | Hillard .................. G06N 20/00 |
| 2019/0045026 A1* | 2/2019 | Sekharan ................ H04L 67/59 |
| 2019/0334869 A1* | 10/2019 | Grant .................. H04L 63/0823 |
| 2020/0366592 A1* | 11/2020 | Ehrat ...................... H04L 45/44 |
| 2021/0281662 A1* | 9/2021 | Mathur .................. G06N 20/00 |
| 2021/0390188 A1* | 12/2021 | Mireshghallah ........ G06F 21/60 |
| 2022/0358375 A1* | 11/2022 | Finnie ...................... G06N 5/04 |
| 2022/0391749 A1 | 12/2022 | Feldman et al. |
| 2023/0020939 A1 | 1/2023 | Klein et al. |
| 2023/0097169 A1 | 3/2023 | Dwivedi et al. |
| 2024/0220832 A1* | 7/2024 | Dhakal .................... G06F 9/54 |

\* cited by examiner

MANAGING ARTIFICIAL INTELLIGENCE INFERENCE REQUESTS THAT ARE DIRECTED TO AN AI MODEL EXTERNAL TO A DISTRIBUTED CLOUD COMPUTING NETWORK

CROSS-REFERENCE TO RELATED APPLICATIONS

This application claims the benefit of U.S. Provisional Application No. 63/585,593, filed Sep. 26, 2023, which is hereby incorporated by reference.

FIELD

Embodiments of the invention relate to the field of cloud computing and artificial intelligence; and more specifically, to managing artificial intelligence inference requests that are directed to an AI model that is external to a distributed cloud computing network.

BACKGROUND

Artificial Intelligence (AI) is widely used for many different applications. AI can include generative AI and predictive AI. The use of AI includes training a model and performing inference with the trained model. Generative AI, such as large language models, are typically trained on very large datasets (e.g., scraping the entire internet) using specialized hardware such as graphics processing units (GPUs). Generative AI can be used for generating text, generating images, and/or generating video. Predictive AI is typically trained on a smaller dataset compared to a generative AI model and can be used for anomaly detection and categorization. Predictive AI can often be performed on central processing units (CPUs) as opposed to GPUs.

Cloud based networks may include multiple servers that are geographically distributed. The servers may be part of a content delivery network (CDN) that caches or stores content at the servers to deliver content to requesting clients with less latency due, at least in part, to the decreased distance between requesting clients and the content. Serverless computing is a method of providing backend services on an as-used basis. A serverless provider allows users to write and deploy code without the hassle of worrying about the underlying infrastructure. Despite the name serverless, physical servers are still used, but developers do not need to be aware of them. Many serverless computing environments offer database and storage services, and some allow for code to be executed on the edge of the network and therefore close to the clients.

SUMMARY

In one aspect, a compute server of a distributed cloud computing network manages inference requests that are directed to AI models that are external to the distributed cloud computing network. The compute server receives an inference request that is directed to an AI model hosted at a destination external to the distributed cloud computing network. The compute server determines that the inference request satisfies security rules associated with the AI model. Upon determining that the inference request is not answerable from a cache, the compute server transmits the inference request to the AI model hosted at the external destination. The compute server receives an inference response from the AI model in response to the inference request, transmits the inference response, and stores the inference request and the inference response in cache.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In one aspect, a distributed cloud computing network allows customers to deploy and use their own AI model(s) to the distributed cloud computing network, use AI model(s) provided by the distributed cloud computing network, and/or use AI model(s) provided by third-parties at the distributed cloud computing network. An inference request is received at a compute server of the distributed cloud computing network. The inference request may trigger the execution of code that is related to an AI application that interacts with the inference request and causes the input of the inference request to be run through an AI model. If the AI model is not loaded at the compute server or there is not sufficient compute resource availability, the inference request is routed to another compute server of the network that has the AI model loaded and has sufficient compute resource availability. If the AI model is not loaded on any compute server of the network, the AI model is fetched from storage and loaded.

In another aspect, a distributed cloud computing network manages inference requests that are directed to AI models that are external to the distributed cloud computing network. The distributed cloud computing network can provide a caching service, rate limiting, retry requests, and analytics for such third-party AI models. Such analytics can be aggregated across multiple providers and/or multiple AI models.

Figure 1:
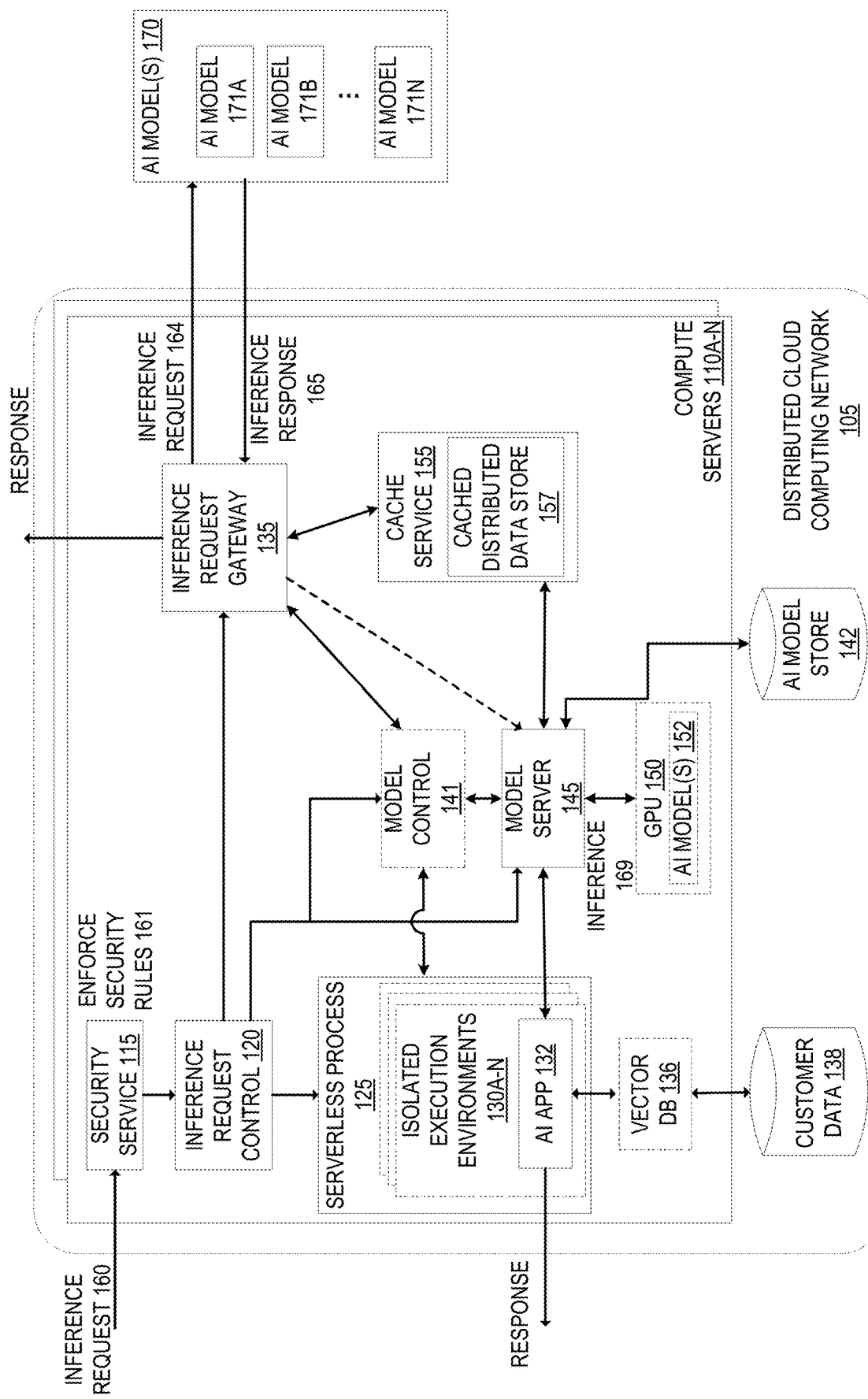
FIG. 1 illustrates an exemplary system for providing AI services in a distributed cloud computing network, according to an embodiment.

FIG. 1 illustrates an exemplary system for providing AI service(s) in a distributed cloud computing network, according to an embodiment. The distributed cloud computing network 105 includes the compute servers 110A-N. The compute servers 110A-N can be part of multiple datacenters. There may be hundreds to thousands of compute servers. Each datacenter can also include one or more control servers, one or more DNS servers, and/or one or more other pieces of network equipment such as router(s), switch(es), and/or hub(s). In an embodiment, each compute server within a datacenter may process network traffic (e.g., TCP, UDP, HTTP/S, SPDY, FTP, TCP, UDP, IPSec, SIP, or other IP protocol traffic).

In an embodiment, a proper subset of the compute servers 110A-N includes specialized hardware for training an AI model and/or performing inference such as one or more GPUs and/or one or more NPUs. In such an embodiment, other ones of the compute servers 110A-N do not include such specialized hardware but may perform training and/or inference using CPUs. In another embodiment, each of the compute servers 110A-N of the distributed cloud computing network 105 includes specialized hardware for training AI models and/or performing inference.

The distributed cloud computing network 105 includes the AI model store 142, which is a repository for AI models that can be used on the distributed cloud computing network 105. The AI model store 142 may be a distributed data store provided by the distributed cloud computing network 105. The AI model store 142 may store different pretrained models with different sizes and different specializations. For example, the AI model store 142 may have one or more models for text classification, image classification, large language models, embedding models, translation models, code generation models, sentiment analysis models, and/or domain-specific models (e.g., models for medical information, models for legal information). As another example, the AI model store 142 can store multiple models of the same family of models with different parameter sizes. As another example, the AI model store 142 can store the same model at different quantization levels. The AI model store 142 can include models that are uploaded by customers (which may be private to those customers), provided by third parties, and/or provided by the provider of the distributed cloud computing network 105. A model uploaded by a customer may be trained on the distributed cloud computing network 105 or trained externally to the distributed cloud computing network 105.

The model server 145 handles loading the models, including fetching the AI models from the AI model store 142 and/or from an external AI model repository (external to the distributed cloud computing network 105). The model server 145 manages the execution of the AI models on the distributed cloud computing network 105. The model server 145 can provide scheduling of the inference operations on the hardware (e.g., CPU, GPU, and/or NPU). The model server 145 may provide metrics (e.g., inference request metrics, GPU metrics, NPU metrics, and/or CPU metrics). The model server 145 may use a client-server model where clients of the model server 145 make requests of the model server 145. As will be described in greater detail, an AI application executing on the distributed cloud computing network 105 may be a client of the model server 145 and an inference request gateway may be a client of the model server 145. Requests can be received at the model server 145 through an API or other communication mechanism (e.g., HTTP/REST, gRPC). In an embodiment, each of the compute servers 110A-N that executes AI models has an instance of the model server 145.

The distributed cloud computing network 105 receives inference requests such as the inference request 160. An inference request includes input or reference to input that is provided to an AI model for performing an inference operation. Such input may include text, image(s), video(s), and/or audio. The inference requests may be for AI model(s) external to the distributed cloud computing network 105 (e.g., the external AI model(s) 170) or for AI model(s) that are executed internally on the distributed cloud computing network 105 (e.g., provided by the AI model store 142).

An inference request may be received at the distributed cloud computing network 105 in various ways. As an example, the inference request may be received at an API provided by the distributed cloud computing network 105. As another example, the inference request may be received at a webserver of the distributed cloud computing network 105. As another example, the inference request may be received due to a client device being configured to transmit all traffic to the distributed cloud computing network 105. For example, an agent on the client device (e.g., a VPN client) may be configured to transmit traffic to the distributed cloud computing network 105. As another example, a browser extension or file can cause the traffic to be transmitted to the distributed cloud computing network 105. In any of the above examples, a particular inference request may be received at a particular datacenter that is determined to be closest to the transmitting client device in terms of routing protocol configuration (e.g., Border Gateway Protocol (BGP) configuration) according to an anycast implementation as determined by the network infrastructure (e.g., router(s), switch(es), and/or other network equipment between the transmitting client device and the datacenters) or by a geographical load balancer.

An inference request that is received can trigger the execution of code at a compute server 110. The code can also be triggered by other trigger events, such as a predefined scheduled time, an alarm condition being met, an external event such as a receipt of an email, text message, or other electronic communication, or a message being sent to a queue system. The code may be third-party code written or deployed by a customer of the distributed cloud computing network and/or first-party code written or deployed by the provider of the distributed cloud computing network. The code may be part of a serverless application. The code can be, for example, a piece of JavaScript or other interpreted language, a Web Assembly (WASM) compiled piece of code, or other compiled code. In an embodiment, the code is compliant with the W3C standard ServiceWorker API. The code is typically executed in a runtime on a compute server and is not part of a webpage or other asset of a third-party. In an embodiment, the code can be executed at any of the compute servers. The code is sometimes referred herein as an AI application.

In an embodiment, each AI application is run in an isolated execution environment, such as run in an isolate of the V8 JavaScript engine. Thus, as illustrated in FIG. 1, a compute server 110 includes the isolated execution environments 130A-N that each execute a separate AI application 132. The isolated execution environments 130A-N on a compute server can be run within a single process (the serverless process 125). This single process can include multiple execution environments at the same time, and the process can seamlessly switch between them. Code in one execution environment cannot interfere with code running in a different execution environment, despite being in the same process. The execution environments are managed in userspace rather than by an operating system. Each execution environment uses its own mechanism to ensure safe memory access, such as preventing the code from requesting access to arbitrary memory (restricting its use to the objects it has been given) and/or interpreting pointers within a private address space that is a subset of an overall address space. In an embodiment, the code is not executed using a virtual machine or a container. However, in other embodiments, the code is executed using a virtual machine or a container.

The distributed cloud computing network 105 may include an API for interacting with AI models. This API is referred to herein as a model server API. For example, an API call may be used for transmitting an inference request to a model server. The model server API may also be used to retrieve information about the models such as a listing of the available models, details of the models, and/or status of the models (e.g., whether they are loaded, where they are loaded).

As described earlier, in an embodiment, the distributed cloud computing network 105 executes models internally on the network. In such an embodiment, a customer of the distributed cloud computing network 105 can deploy their own custom AI model to the distributed cloud computing network 105, configure and use AI model(s) provided by the provider of the distributed cloud computing network 105, and/or deploy a third-party model to the distributed cloud computing network 105. The models that are deployed may be pre-trained elsewhere and/or trained at the distributed cloud computing network 105.

Although not illustrated in FIG. 1, the distributed cloud computing network 105 can include a control server that provides a set of tools and interfaces for a customer to, among other things, deploy and/or configure AI models for execution in the distributed cloud computing network 105 and/or configure settings for external AI model execution. As an example of deploying and configuring an AI model for execution in the distributed cloud computing network 105, the customer may use the control server to configure the runtime environment; upload a custom AI model; and/or upload and/or write the AI application 132. The AI application 132 may include code for interacting with the inference request (e.g., get the content of the inference request such as text, image, audio, video, etc.); define the model input structure (e.g., construct a tensor with the input date); cause the input to be run through the AI model; and structure and send the response depending on the result of the model.

In an embodiment, a customer can deploy different models and/or different quantizations of models that can be used in different situations. For example, the customer can define a different model and/or different quantization of model to be run on end-user devices (e.g., laptops, desktops, smartphones, IoT devices, vehicles, wearable devices, set top boxes, streaming devices, gaming systems, etc.), a different model and/or different quantization of model to be run on the distributed cloud computing network 105, and/or a different model and/or different quantization model that runs on a third-party system. In this case, the end-user device would contain code (the client module) provided by the cloud provider or implemented by the cloud provider customer that is capable of loading from local storage or receiving the from the inference service, or alternatively initiating an inference request to the inference server. This client module would determine based on the capabilities of the device such as available memory, CPU performance, or availability of hardware acceleration such as GPUs, and the policies selected by the cloud provider customer, whether to compute an inference using the model on the device or initiate a network request to the cloud computing network 105. This client module may include cross-platform code such as WebAssembly or may use platform specific capabilities such as CoreML. The cloud computing network may provide different versions or representations of the models based on the platform and capabilities of the end user device.

As another example, the customer can configure the model settings for balancing accuracy, speed, and/or cost. For instance, larger models are typically more accurate than smaller models but take longer to generate a response to an inference request and may cost more; and smaller models are typically less accurate than larger models but are faster to generate a response to an inference request and may cost less. If the customer wants the highest accuracy, the customer may choose to use a larger model versus a smaller model. If the customer wants the highest speed, the customer may choose to use a smaller model versus a larger model. If the customer wants a balance of accuracy and speed, the customer may use a medium-sized model for their application.

In an embodiment, the distributed cloud computing network 105 dynamically determines the model and/or model size to use on behalf of the customer. For example, the distributed cloud computing network 105 may run a relatively simple and fast model (referred to herein as a "draft" model) to classify the contents of the inference request and determine which model and/or size of model to run for the request. The draft model analyzes the input of the inference request (e.g., the text, the image content or resolution, and/or the audio or video content and complexity) to make this prediction. As an example, a customer may deploy a first model that is specialized for coding and a second model that is specialized for medical information; and the draft model can classify the inference request to either the first model or the second model. As another example, the draft model can be configured to detect whether an inference query is malicious (e.g., part of a prompt injection attack) or wasteful (e.g., part of a denial of wallet attack); and if detected, can block the inference request from being processed by the target model or processed by a smaller model.

In addition, or in lieu of determining the model and/or model size to use on behalf of the customer, the compute server may determine how much compute is needed to give accurate results for processing a particular inference operation. This decision may be based on a threshold of complexity of the inference request. For example, a relatively simple inference request may be run in a small model (e.g., executing on a CPU) and a relatively complex inference request may be run in a large model (e.g., executing on a GPU).

The dynamic determination of the model and/or model size consider the network and/or compute conditions of the distributed cloud computing network 105. For example, if the compute resource availability (e.g., available GPU cycles, available GPU memory, available CPU cycles, and/or available memory) is below a threshold, a smaller model may be selected by the distributed cloud computing network 105; and if the compute resource availability is above a threshold, the distributed cloud computing network 105 can select a larger model.

In an embodiment, the distributed cloud computing network 105 includes the inference request gateway 135. The inference request gateway 135 manages inference requests that are not directed to an AI application running on the distributed cloud computing network 105. For example, the inference request gateway 135 may receive AI inference requests for AI models that run externally to the distributed cloud computing network 105. As another example, the inference request gateway 135 may receive an AI inference request for an AI model that runs internally to the distributed cloud computing network 105 but is not generated from an AI application that is executing on the distributed cloud computing network 105. As another example, the inference request gateway 135 may receive an AI inference request from an AI application that executes on the distributed cloud computing network 105 and is requesting the use of an AI model that runs externally to the distributed cloud computing network. In an embodiment, each of the compute servers 110A-N has an instance of the inference request gateway 135.

An inference request that is directed to the inference request gateway 135 may be received at the distributed cloud computing network 105 in various ways. As an example, the inference request may be received at an API provided by the distributed cloud computing network 105. For example, in the customer's API application (which may be running externally to the distributed cloud computing network 105 or may be running on the distributed cloud computing network 105), the customer may replace the external model endpoint with an endpoint provided by the distributed cloud computing network. Such an endpoint (e.g., URL) can identify the third-party provider and/or model. As another example, an agent on the client device (e.g., a VPN client) may be configured to transmit traffic to the distributed cloud computing network 105 including any inference requests to third-party applications. As another example, a browser extension or file can cause the traffic to be transmitted to the distributed cloud computing network 105.

The inference request gateway 135 can provide a caching service, rate limiting, retry requests, and provide analytics for third-party AI models. For example, regardless of the model or infrastructure used, the inference request gateway 135 can log requests and analyze data such as the number of requests, number of users, cost of running an AI application, duration of requests, etc. Further, the inference request gateway 135 allows for these analytics to be aggregated across multiple providers and/or multiple AI models. The caching service may cache the inference requests and the corresponding responses so that new inference requests can be served from the cache service 155 rather than the original API endpoint (e.g., third-party model). Caching increases inference request processing speed and reduces costs for the customer. Rate limiting can also control expenses by throttling the number of requests and preventing excessive or suspicious activity.

As illustrated in FIG. 1, the distributed cloud computing network 105 may perform one or more security services (represented by the security service 115) on each inference request. The security services may include DDOS protection, secure session (SSL/TLS) support, web application firewall, access control, compliance, zero-trust policies, data loss prevention (DLP), detection of suspicious or undesired model inputs and undesired response content ("jailbreak detection"), and/or rate limiting.

By way of example, a customer can define requirements for accessing an AI application (e.g., the AI application 132) running on the distributed cloud computing network 105 and/or an external AI model. These requirements may be based on identity-based rules and/or non-identity based rules. An identity-based access rule is based on the identity information associated with the user making the request (e.g., username, email address, etc.). Example rule selectors that are identity-based include access groups, email address, and emails ending in a specified domain. For instance, an identity-based access rule may define email addresses or groups of email addresses (e.g., all emails ending in @example.com) that are allowed and/or not allowed. A non-identity based access rule is a rule that is not based on identity. Examples include rules based on location (e.g., geographic region such as the country of origin), device posture, time of request, type of request, IP address, multifactor authentication status, multifactor authentication type, type of device, type of client network application, whether the request is associated with an agent on the client device, an external evaluation rule, and/or other layer 3, layer 4, and/or layer 7 policies.

As another example, a customer can define rate limit(s) for the number of inference requests processed by an AI application running on the distributed cloud computing network 105 and/or sent to an external AI model. The rate limit(s) may be applicable per model or per application. If the rate limit has been exceeded, the distributed cloud computing network 105 may drop the inference request or put it in a queue.

As another example, a customer can define an estimated budget for running inference operations on the distributed cloud computing network and/or for running inference operations on external AI models.

As another example, a customer can define data loss prevention (DLP) rules. The inference request gateway 135 and/or the model control 141 can be used with a data loss prevention (DLP) service provided by the distributed cloud computing network 105. These DLP rules can prevent or mitigate the exposure of sensitive information (e.g., personal information, company information, etc.). In such embodiments, an inference request can be analyzed to identify information matching known formats of sensitive information, including social security numbers, credit numbers, API keys, account numbers, passwords, phone numbers, addresses, etc. The DLP service can identify sensitive information by matching customer-defined keywords, password character/length requirements, and/or analyzing field names. In some embodiments if sensitive information is found, the sensitive information in the inference request can be redacted or obfuscated, or the inference request can be flagged as including sensitive information or blocked entirely. Although not shown in FIG. 1, DLP rules may also be applicable when training a model using the distributed cloud computing network 105. For example, the training data may be run through the DLP service to prevent exposure of sensitive information from being in the trained model.

As another example, the customer can enable detection of inputs designed to cause the generative AI model to generate undesired responses or the detection of undesired responses. Both the customer and the provider of the distributed cloud computing network 105 may have a list of words or input patterns used to generate undesired responses. The provider of the distributed cloud computing network 105 may also use an additional AI model to measure the sentiment or classify the input or response of an ML model and log or block the request as configured by customer policy.

There may be datacenters or compute servers that are not permitted, via policy, to perform a particular inference operation. For instance, a policy may be defined by the customer that specifies a geographic location of allowed processing and/or a geographic location of unallowed processing. The policy may be defined based on the source of the inference request. For example, there may be a policy that for an inference request that originates from Europe, that the inference operation be only processed at a server located in Europe. As another example, a policy may be defined by the customer that specifies that the inference operation must be performed by particular hardware (e.g., GPU, a particular model or characteristic of GPU, etc.).

After enforcing the security rules 161, the inference request 160 is processed by the inference request control 120. The inference request control 120 determines where the request will be next processed. In the example shown in FIG.

1, the inference request control 120 determines whether the inference request is to be processed by the AI application 132, by the inference request gateway 135, or by the model server 145. For example, if the inference request 160 is an API call to the model server 145, the inference request control 120 routes the inference request to the model server 145. If the inference request is for a model that is external to the distributed cloud computing network, the inference request control 120 routes the inference request to the inference request gateway. If the inference request 160 triggers the execution of the AI application 132, the inference request control 120 routes the inference request to the serverless process 125. For example, the inference request control 120 may include a script that determines whether the inference request is to be handled by the AI application 132. Such a script can determine that the request triggers execution of the AI application 132 by matching the zone to a predetermined matching pattern that associates the AI application 132 with the predetermined matching pattern. The inference request control 120 annotates the inference request with an identifier of the AI application 132 (as determined by a script mapping table) and forwards the inference request to the serverless process 125. The inference request control 120 can determine the inference request is destined to the inference request gateway 135 if it is directed at a predefined API endpoint.

The AI application 132 can take various actions depending on how it is written. As an example, the AI application 132 can run the input of the inference request 160 to one or more models that are internal to the distributed cloud computing network 105 (e.g., a custom model of the customer, a third-party model that is deployed on the distributed cloud computing network 105, and/or a model provided by the distributed cloud computing network 105) and/or to one more models that are external to the distributed cloud computing network 105 (e.g., any one or more of the AI models 171A-171N).

With respect to the AI application 132, to run a model internally to the distributed cloud computing network 105, the AI application 132 calls the model through the model server 145. Inference requests can be received at the model server 145 through an API or other communication mechanism (e.g., HTTP/REST, gRPC). In addition to, or in lieu of running an AI application 132, a model server API can be provided that allows any application, including those external to the distributed cloud computing network 105, to call the model through the model server 145. The model server 145 handles loading the models including fetching the AI models from the AI model store 142. For instance, the model server 145 handles loading the AI model(s) 152 on the GPU 150 (or other hardware). The model server 145 performs the inference operation 169 using hardware of a compute server 110 such as a GPU. The model server 145 can (e.g., if configured by the customer), use the cache service 155 when responding to the inference request.

In an embodiment, the distributed cloud computing network 105 provides a vector database 136. The vector database 136 may be accessed through an API by the AI application 132 and/or by external applications. To use the vector database 136, the customer can run source data through a model (such as an embedding model) internally on the distributed cloud computing network 105 and/or externally to the distributed cloud computing network 105 to generate embeddings (vectors) and store the embeddings in the vector database 136. An embedding is associated with the data that was used to create it. The application (e.g., the AI application 132 or an external application) can take the input and run it through the same model to generate an embedding and lookup similar embeddings in the vector database 136 and retrieve the original customer data (which may be stored in a database internal to the distributed cloud computing network 105 or externally to the distributed cloud computing network 105).

The model control 141, which is optional in some embodiments, can dynamically select the model and/or model size. The model control 141 may determine, based on the context of the inference request, the type of model that is best suited to perform the inference operation. As an example, if the request includes image data, then a model for image classification may be selected. As another example, the request may include tags or metadata that provide context. In an embodiment, the model control 141 runs (e.g., through the model server 145) a relatively simple and fast model (referred herein as a "draft" model) to classify the contents of the inference request and determine which model and/or size of model to run for the request. The draft model analyzes the input of the inference request (e.g., the text, the image content or resolution, and/or the audio or video content and complexity) to make this prediction. As an example, a customer may deploy a first model that is specialized for coding and a second model that is specialized for medical information; and the draft model can classify the inference request to either the first model or the second model. As another example, the draft model can be configured to detect whether an inference query is malicious (e.g., part of a prompt injection attack) or wasteful (e.g., part of a denial of wallet attack); and if detected, can block the inference request from being processed by the target model or processed by a smaller model.

In addition, or in lieu of determining the model and/or model size to use on behalf of the customer, the compute server may determine how much compute is needed to give accurate results for processing a particular inference operation. This decision may be based on a threshold of complexity of the inference request. For example, a relatively simple inference request may be run in a small model (e.g., executing on a CPU) and a relatively complex inference request may be run in a large model (e.g., executing on a GPU).

In an embodiment, the model control 141 uses a cascading model system to perform the inference operation. The cascading model system includes multiple (two or more models) with increasing sizes and accuracy (and thus increasing computation cost). The cascading model starts with the smallest model first to perform the inference operation. If the result of the first model inference operation is an output that exceeds a predefined confidence value, that result is used and the inference processing stops. However, if the result of the first model inference operation is an output that does not exceed the predefined confidence value, then the next model is used to perform the inference operation. This process may be performed until the last model in the cascading model system performs an inference operation. In such an embodiment, the lighter weight first model may be able to provide a fast result that is accurate for some or many inference requests and larger weight models that may be slower may be used to provide a more accurate result if the result of the first model is not satisfactory. The predefined confidence values can be configured by the customer. In an example, the multiple models may include a base model (as the last model) and one or more quantized models of the base model. In another example, the multiple models may include the same family of models with different parameter sizes. In another example, the multiple models may include a different family of models.

The model control 141 may determine to use a cascading model system based on the model and/or purpose of the model. For instance, if it is expected that the majority of inference requests can accurately be responded to using a small model, a cascading model system may be used. This determination may be done by running each inference request (or some sample of requests) through the smaller model and the larger model to verify the accuracy of the smaller model. If the smaller model provides accurate results over a threshold of requests, a cascading model system may be used.

In an embodiment, the model control 141 causes a smaller model to perform the inference operation while waiting for a larger model to be loaded. For instance, if an inference request is received for a model (e.g., a large model) that is not yet loaded, the model control 141 may cause the model server 145 to use a smaller model (e.g., a quantized version of the model and/or a smaller parameter version of the model) for the inference operation and cause the model server 145 to load the larger model. Thus, inference requests are processed by the smaller model until the larger model is loaded. As an example, with a streaming model (e.g., a voice-to-text translation from audio or video, a text completion model) a smaller model can be used immediately while a larger model can be loaded in the background (which could be at a different compute server) to take over during the streaming model when it is ready.

As described elsewhere, in some embodiments only a proper subset of the compute servers 110A-N have a GPU and/or NPU for performing inference operations. Depending on the size requirements of the AI models and the capacity of the hardware, it is possible that only one or more particular AI models are loaded at any particular compute server. As an example, a large language model, which are typically large and require substantial GPU memory to run effectively, may be loaded on only certain ones of the compute servers 110A-N. However, small models may be loaded on more (or all) of the compute servers 110A-N.

It is thus possible for an AI inference request to be received at a compute server that does not have the target AI model loaded to perform the AI inference operation. Further, it is possible for that compute server not to be able to practically load the AI model (e.g., if the target AI model practically requires a GPU and one is not available at that compute server). In such a case, to process the inference operation, a compute server that receives an inference request for an AI model that is not loaded at that compute server can load the AI model (only if requirements are met) or forward the inference request to another compute server (which may or may not be part of the same data center) that has the AI model loaded or will load the AI model. Further, it is possible for a compute server to receive an inference request that it does not have the capacity to process at that time (even though it may have the AI model to perform the inference operation). In such a case, the compute server can queue the inference operation to perform when it has capacity or forward the inference request to another compute server to perform the inference operation.

Figure 2:
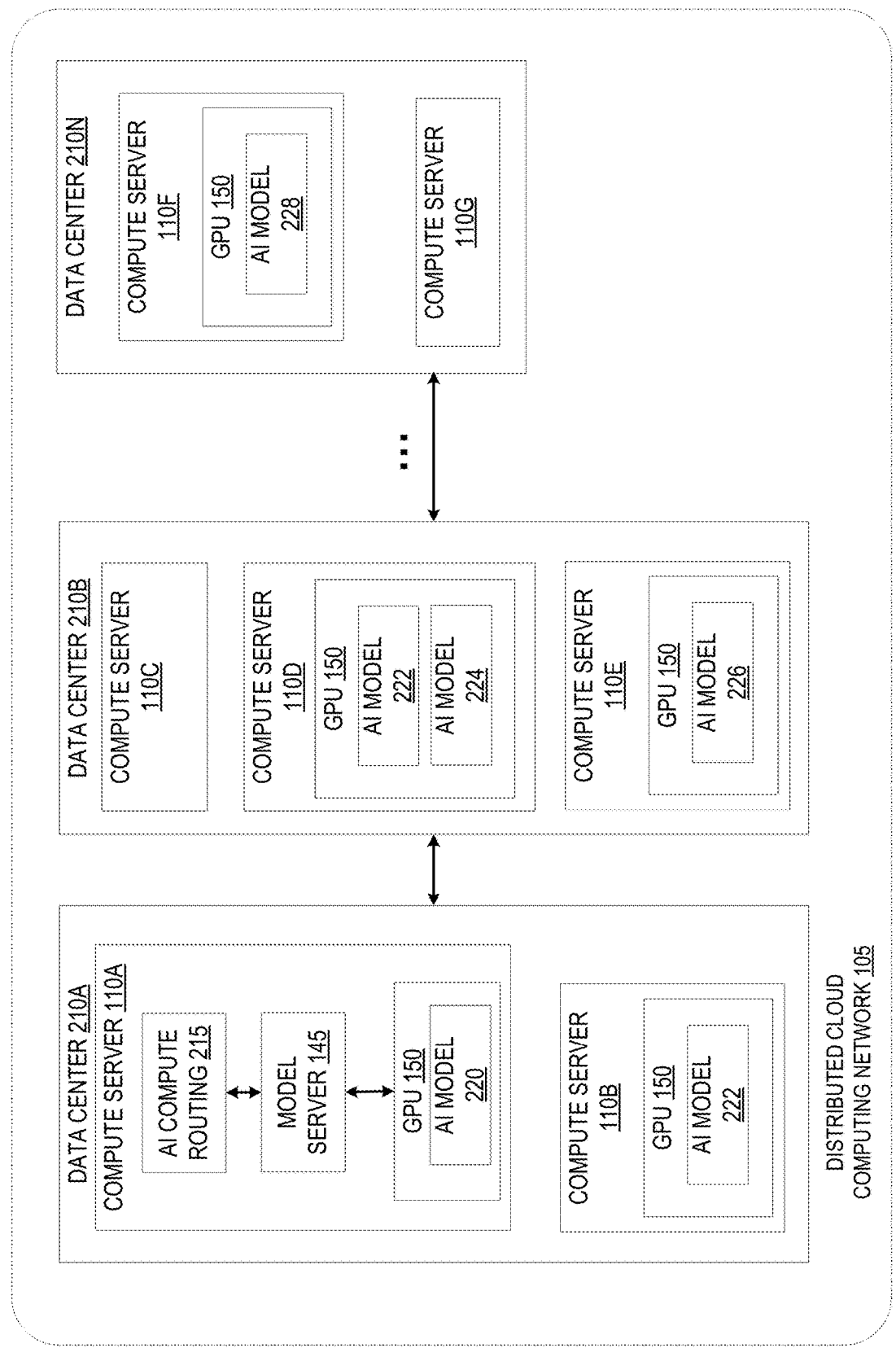
FIG. 2 illustrates an example of the distributed cloud computing network where certain AI models are only loaded on certain compute servers according to an embodiment.

In an embodiment, the model control 141 includes a model for determining where to execute the AI inference operation in the distributed cloud computing network 105. FIG. 2 illustrates an example of the distributed cloud computing network 105 where certain AI models are only loaded in certain compute servers. FIG. 2 shows the data centers 210A-210N, each including one or more compute servers. The data center 210A includes the compute server 110A and the compute server 110B. The data center 210B includes the compute server 110C, the compute server 110D, and the compute server 110E. The data center 210N includes the compute server 110F and the compute server 110G. The determination of which locations can be used to execute AI inference for each AI model can take into account several relevant factors, including the volumes of requests originating from various geographic locations, the capabilities of the server, the time of day, and the overall volume. The determination of which locations to use and how many instances of each compute server are used for individual AI models may be made to maximize global functions such as minimal latency, minimal unserviced requests, or maximal utilization.

The compute server 110A includes the AI compute routing 215 and the model server 145. Although not illustrated to not obscure understanding, the other compute servers 110B-110G may each have an instance of the model server 145 and AI compute routing 215. The compute server 110A includes the GPU 150 and has (currently loaded) the AI model 220. The compute server 110B includes the AI model 222 loaded on the GPU 150. The compute server 110C does not have a GPU and does not have an AI model loaded. The compute server 110D includes the AI model 222 loaded on the GPU 150 and the AI model 224 loaded on the GPU 150. The compute server 110E includes the AI model 226 loaded on the GPU 150. The compute server 110F includes the AI model 228 loaded on the GPU 150. The compute server 110G does not have a GPU and does not have an AI model loaded.

The AI compute routing 215 determines where to execute the AI inference operation in the distributed cloud computing network 105. This determination may be based on an optimization goal and a set of one or more properties. An optimization goal can be based on factors such as latency, expense, throughput, reliability, bandwidth, AI model processing readiness, compute resource availability, accuracy, and/or processing capability. The optimization goal may be defined by the customer and/or be defined by the provider of the provider of the distributed cloud computing network 105. The set of one or more properties may include one or more metrics and/or one or more attributes. The set of properties can be stored in a data structure that is accessible to the compute server making the decision.

Latency includes the time to perform the inference operation and return a result. Latency can include network latency. An optimization goal to minimize latency may lead to a selection of where to execute the AI inference operation at a compute server that leads to the lowest total latency to return the result.

Expense refers to the cost of processing (e.g., cost of CPU/hr, cost of GPU/hr, cost of using certain network links). The expense can differ based on the time of day (e.g., electricity cost may be lower at night versus the day). An optimization goal to minimize cost may lead to a selection of a compute server and/or network links that are the least expensive.

Throughput refers to the amount of data being processed. An optimization goal to maximize throughput may lead to the inference operation being distributed in the distributed cloud computing network such that the total throughput is maximized (e.g., move work from an overutilized datacenter to an underutilized datacenter).

Reliability refers to the reliability of network links and/or datacenters. For instance, some network links may be more reliable than others. An optimization goal to maximize reliability may lead to a selection of the datacenter(s) and/or network link(s) that are the most reliable.

Bandwidth refers to the bandwidth of the network links. An optimization goal based on bandwidth may lead to a selection of the datacenter(s) and/or network link(s) that have the largest bandwidth.

AI model processing readiness refers to the readiness of an AI model for processing the AI inference operation. Large AI models may take seconds to minutes to load into memory (e.g., GPU memory). Thus, loading an AI model adds latency to processing the inference operation. The property of the AI model processing readiness may be used in other optimization goals such as an optimization goal to minimize latency.

Compute resource availability refers to the availability of compute resources at a datacenter and/or compute server, such as available CPU cycles, available GPU cycles, available GPU memory, available memory, available disk space, etc.

Accuracy refers to the accuracy of the responses provided by the AI models. Generally, for the same class of models, larger models are more accurate than smaller models. Also, a quantized model is typically less accurate than the corresponding non-quantized model.

Processing capability refers to the processing capability at a datacenter and/or compute server. Different datacenters and/or compute servers can have different processing capabilities including different hardware capabilities (e.g., different numbers and/or types of CPU(s), GPU(s), hardware accelerator(s), storage device type/size, memory type/size) and/or software capabilities. A particular inference operation may be best suited for a particular processing capability. For example, some AI models may be more efficiently run on certain hardware (e.g., GPU vs CPU, a type/model of GPU, etc.).

The set of one or more properties may include one or more metrics including a set of one or more link metrics, a set of one or more compute server metrics, and/or a set of one or more model metrics. The set of link metrics can indicate the latency, monetary expense, throughput, bandwidth, and reliability of the links. The latency from a particular datacenter to a particular destination (e.g., IP address or hostname) can be computed using network probes. The network probe data may include probe data for datacenter-to-datacenter links and/or probe data for datacenter-to-destination links. The probe data for datacenter-to-datacenter links and the probe data for datacenter-to-destination links may determine (at a particular time) for each link, the network average round trip time (RTT), the network minimum RTT, the network maximum RTT, the network median RTT, the network standard deviation, jitter metrics on network RTT, packet loss rate, throughput, IP path MTU, AS path (including number of ASes in the path and which specific ASes are in the path), packet reordering, and/or packet duplication. The compute server metrics may indicate the compute resource availability, current processing cost (e.g., cost of CPU/hr, cost of GPU/hr). The set of model metrics can include, for each AI model, the time (e.g., an average time) to load the AI model (which may be separately computed for separate types of hardware), and/or the average time to perform an inference operation (which may be separately computed for separate types of hardware).

The set of attributes may include attributes of the datacenter or compute server and/or attributes of the AI models. The set of attributes can include location, country, legal jurisdiction, region, datacenter tier type, server/datacenter certification (e.g., ISO-certified, FedRAMP), server generation, server manufacturer, AI model processing readiness (e.g., whether the AI model is loaded), processing capability (e.g., hardware configuration such as CPU, GPU, hardware accelerator(s), co-processor(s), storage device type/size, memory type/size), and/or AI model size.

There may be datacenters or compute servers that are not permitted, via policy, to perform the inference operation. For instance, a policy may be defined by the customer that specifies a geographic location of allowed processing and/or a geographic location of unallowed processing. The policy may be defined based on the source of the inference request. For example, there may be a policy that for an inference request that originates from Europe, that the inference operation be only processed at a server located in Europe. As another example, a policy may be defined by the customer that specifies that the inference operation must be performed by particular hardware (e.g., GPU, a particular model or characteristic of GPU).

Figure 3:
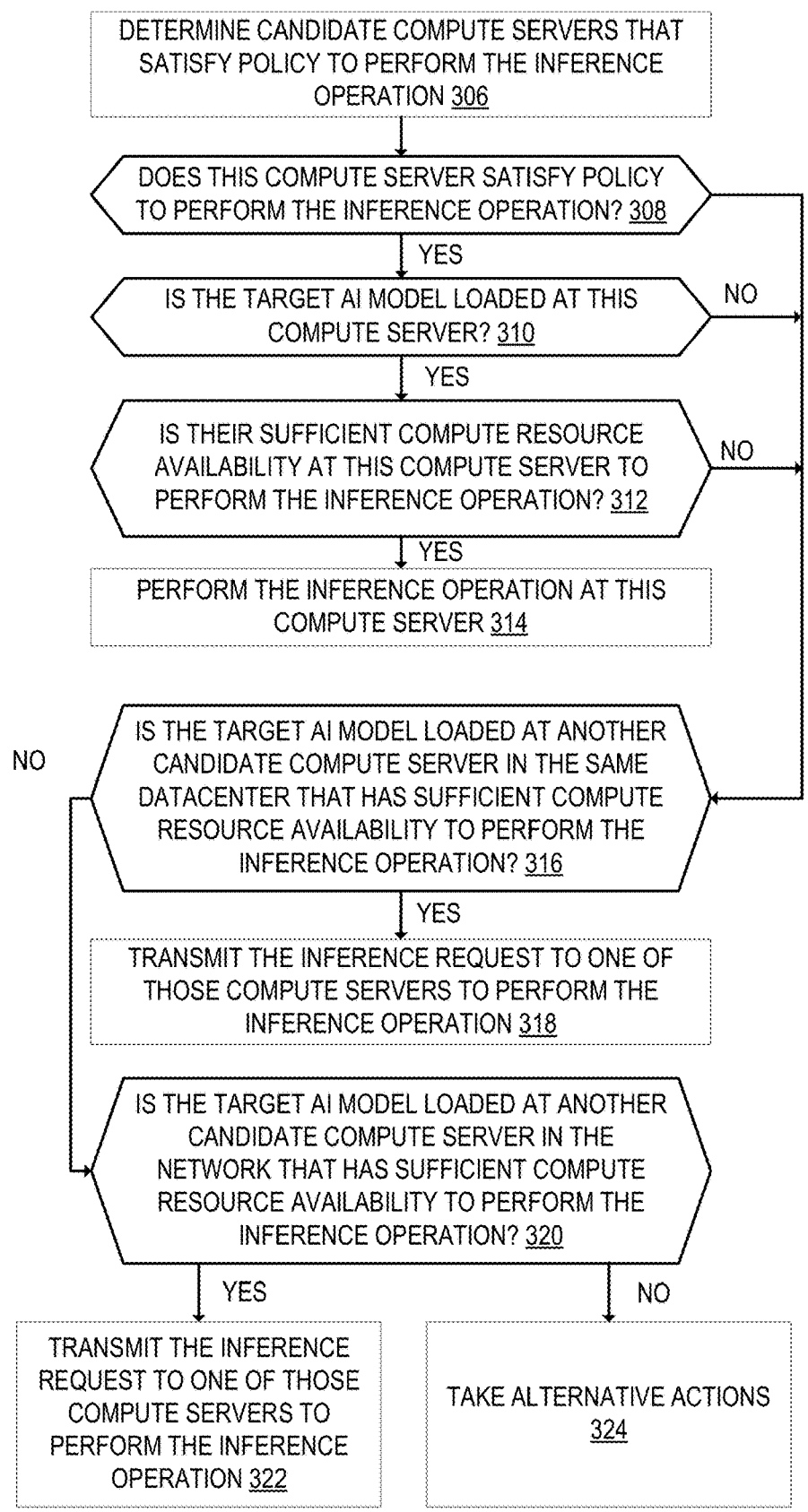
FIG. 3 is a flow diagram that illustrates an exemplary process for selecting where to perform an inference operation in the distributed cloud computing network according to an embodiment.

FIG. 3 is a flow diagram that illustrates an exemplary process for selecting where to perform an inference operation in the distributed cloud computing network according to an embodiment. Prior to the operations of FIG. 3, a compute server (e.g., the compute server 110A) receives an inference request. Also, prior to the operations of FIG. 3, that compute server may perform one or more security services such as DDOS protection, secure session support, web application firewall, access control, compliance, zero-trust policies, data loss prevention, and/or rate limiting.

In an embodiment, inference requests can be associated with different priority values based on one or more factors. For example, different customers may have different priority values (e.g., customers may pay more to receive higher priority for their inference requests). As another example, certain AI models are more sensitive to latency while others may tolerate longer delays. The AI models that are sensitive to latency may have higher priority than those that can tolerate longer delays. Geographic or other restrictions can impact the priority value. For example, some inference requests may need to be processed within a specific region due to data sovereignty compliance or customer policy, whereas other inference requests may not have such limitations. Inference requests that are required to be processed within a specific region may have higher priority than those that are not required to be processed within the specific region (e.g., can be offloaded to a different region).

There may be datacenters and/or compute servers that are not permitted, via policy, to perform the inference operation. For instance, a policy may be defined by the customer that specifies a geographic location of allowed inference operation processing and/or a geographic location of unallowed inference operation processing. The policy may be defined based on the source of the inference request. For example, there may be a policy that for an inference request that originates from Europe, that the inference operation be only processed at a server located in Europe. As another example, a policy may be defined by the customer that specifies that the inference operation must be performed by particular hardware (e.g., GPU, a particular model or characteristic of GPU). At operation 306, the AI compute routing 215 determines the candidate compute servers of the distributed cloud computing network 105 that satisfy the one or more policies applicable for the inference operation.

Next, at operation 308, the AI compute routing 215 of the compute server 110A determines whether the compute server 110A satisfies the one or more policies applicable for performing the inference operation (e.g., whether it is one of the candidate compute servers). If it is not, then operation 316 will be performed. If the compute server 110A does satisfy the policy(ies), the operation 310 is performed. The policy enforcement is optional and may not be performed in all embodiments.

At operation 310, the AI compute routing 215 of the compute server 110A determines whether the target AI model is loaded at the compute server 110A. The target AI model is the one that will perform the AI inference operation. As an example, with respect to FIG. 2, the AI model 220 is loaded on the GPU 150 of the compute server 110A; but the AI model 222, AI model 224, AI model 226, and the AI model 228 are not loaded on the compute server 110A. If the target AI model is loaded, then operation 312 is performed. If the target AI model is not loaded (e.g., the target AI model is not the AI model 220), then operation 316 is performed.

Even if the AI model is loaded, the compute server may not have sufficient compute resource availability (e.g., GPU cycles, GPU memory) to perform the inference operation without waiting for the compute resources to be available. At operation 312, the AI compute routing 215 of the compute server 110A determines whether there is currently sufficient compute resource availability at the compute server 110A to perform the inference operation. This determination may be based on the current metrics such as inference request metrics, GPU metrics, and/or CPU metrics that may be calculated by the model server 145. The inference request metrics can include, per model: inference request counts, number of inference operations successfully performed, number of failed inference operations, number of pending inference operations, and/or quantile latency metrics (e.g., time to handle an inference request, time in queue, time to compute an inference operation). The number of pending inference operations is essentially a queue. The GPU metrics can include: current power usage, current GPU utilization, total GPU memory, and/or current GPU used memory. The CPU metrics can include: current CPU utilization, total CPU memory, and/or current CPU used memory. If there is not sufficient compute resource availability at the compute server 110 to perform the inference operation, then operation 316 is performed. As an example, to determine whether there is sufficient compute resource availability to perform the inference operation, the size of the queue (the number of pending inference operations) is determined and if the size is greater than a threshold (which may be different for different models), then there is not sufficient compute resource availability. If there is sufficient compute resource availability at the compute server 110 to perform the inference operation, then operation 314 is performed.

In an embodiment, the determination of whether there is currently sufficient compute resource availability also considers the priority value of the inference request. The compute server may reserve some capacity for the model for high priority inference requests or location restricted inference requests to be processed without being transmitted to another compute server. For example, if the priority value indicates a regular priority inference request (as opposed to a high-priority inference request or a location restricted inference request), the compute server determines whether the size of the queue is greater than a threshold for regular priority inference requests and if it is, then there is not sufficient compute resource availability. The reservation of capacity for high priority inference requests or location restricted inference requests may only occur upon the compute server capacity reaching a utilization threshold (e.g., if over 25% of compute resource availability).

At operation 314, the inference operation is performed. For example, the AI compute routing 215 may transmit the inference request to the model server 145. The result of the inference operation is returned to the requester (e.g., the AI application 132 or the inference request gateway 135). The result of the inference operation may also be cached.

At operation 316, the AI compute routing 215 determines whether the target AI model is loaded at another candidate compute server in the same datacenter that has sufficient compute resource availability to perform the inference operation. For example, if the target AI model is the AI model 222, which is loaded on the compute server 110B, the AI compute routing 215 may select that compute server for processing the inference operation if it has sufficient compute resource availability. However, if the target AI model is the AI model 220 (or otherwise not the AI model 222), then there is not a compute server in the same datacenter (the datacenter 210A) that has the model loaded and has sufficient compute resource availability. If the target AI model is loaded at another candidate compute server in the same datacenter that has sufficient compute resource availability to perform the inference operation, then operation 318 is performed; otherwise, operation 320 is performed.

At operation 318, the AI compute routing 215 causes the inference request to be transmitted to one of the compute servers in the same datacenter to perform the inference operation. The result of the inference operation is returned back to the AI compute routing 215 and returned to the requester (e.g., the AI application 132 or the inference request gateway 135). The result of the inference operation may also be cached at the compute server 110A.

At operation 320, the AI compute routing 215 determines whether the target AI model is loaded at another candidate compute server in the distributed cloud computing network (in a different datacenter) that has sufficient compute resource availability to perform the inference operation. If there is, then operation 322 is performed. If there is not, then operation 324 is performed.

At operation 322, the AI compute routing 215 causes the inference request to be transmitted to one of the other compute servers in the distributed cloud computing network 105 to perform the inference operation. If there are multiple qualified compute servers, the AI compute routing 215 selects one of those compute servers. The AI compute routing 215 can use different techniques for selecting such a compute server. For example, the AI compute routing 215 may select the one that will result in the lowest latency (e.g., the closest to the compute server 110A). As another example, the AI compute routing 215 may select the compute server that has the most resource availability.

As another example, the AI compute routing 215 uses a latency-based heuristic with random selection. A time-based budget (or ceiling) of the latency requirement for the AI model to reach another data center can be assigned. The AI compute routing 215 randomly chooses a data center from all the data centers that have a qualified compute server that are within the time budget. If there is not a data center that is within the time budget, then the time budget is increased and the AI compute routing 215 tries again. The AI compute routing 215 then chooses a compute server within that data center from all of those that are within the time budget based on the capacity of each compute server. The AI compute routing 215 can track the number of incomplete requests outstanding with each compute node and choose a compute node that has available capacity either randomly or to minimize peak utilization between compute servers. If there is not a compute server within that data center that is within the time budget, then the time budget is increased and the AI compute routing 215 tries again.

The result of the inference operation is returned back to the AI compute routing 215 and returned to the requester (e.g., the AI application 132 or the inference request gateway 135). The result of the inference operation may also be cached at the compute server 110A.

At operation 324, the AI compute routing 215 takes alternative actions depending on the case. For example, the AI compute routing 215 may determine to load the AI model on a compute server. Loading a particular AI model may require another AI model to be unloaded (e.g., removed from memory). The AI compute routing 215 may select a compute server of the distributed cloud computing network 105 on which the AI model is to be loaded. The selection of the compute server may depend on factors including the size of the AI model, the number of inference requests received for the AI model and/or expected to receive for that AI model, the location of the requesters, the compute resource availability of the compute servers), compliance policy (e.g., where the model is allowed to run and/or not allowed to run), and hardware requirements (which may be defined by the customer). If the AI compute routing 215 determines to load the model on a compute server, the AI compute routing 215 causes that model to be loaded on the compute server. For instance, if the AI compute routing 215 determines to load the model on the compute server 110A, the AI compute routing 215 instructs the model server 145 to load the AI model from the AI model store 142 and then perform the inference operation. If a model must be unloaded, in an embodiment the AI compute routing 215 determines to unload the model that is least recently used or has the fewest inference requests. Instead of loading the AI model, as another example, the AI compute routing 215 may determine to queue the AI inference operation at a compute server. For example, the AI compute routing 215 may determine that it would be faster to put the AI inference operation in a queue (e.g., at the compute server 110A) instead of waiting for the model to load in a different compute server.

Figure 4:
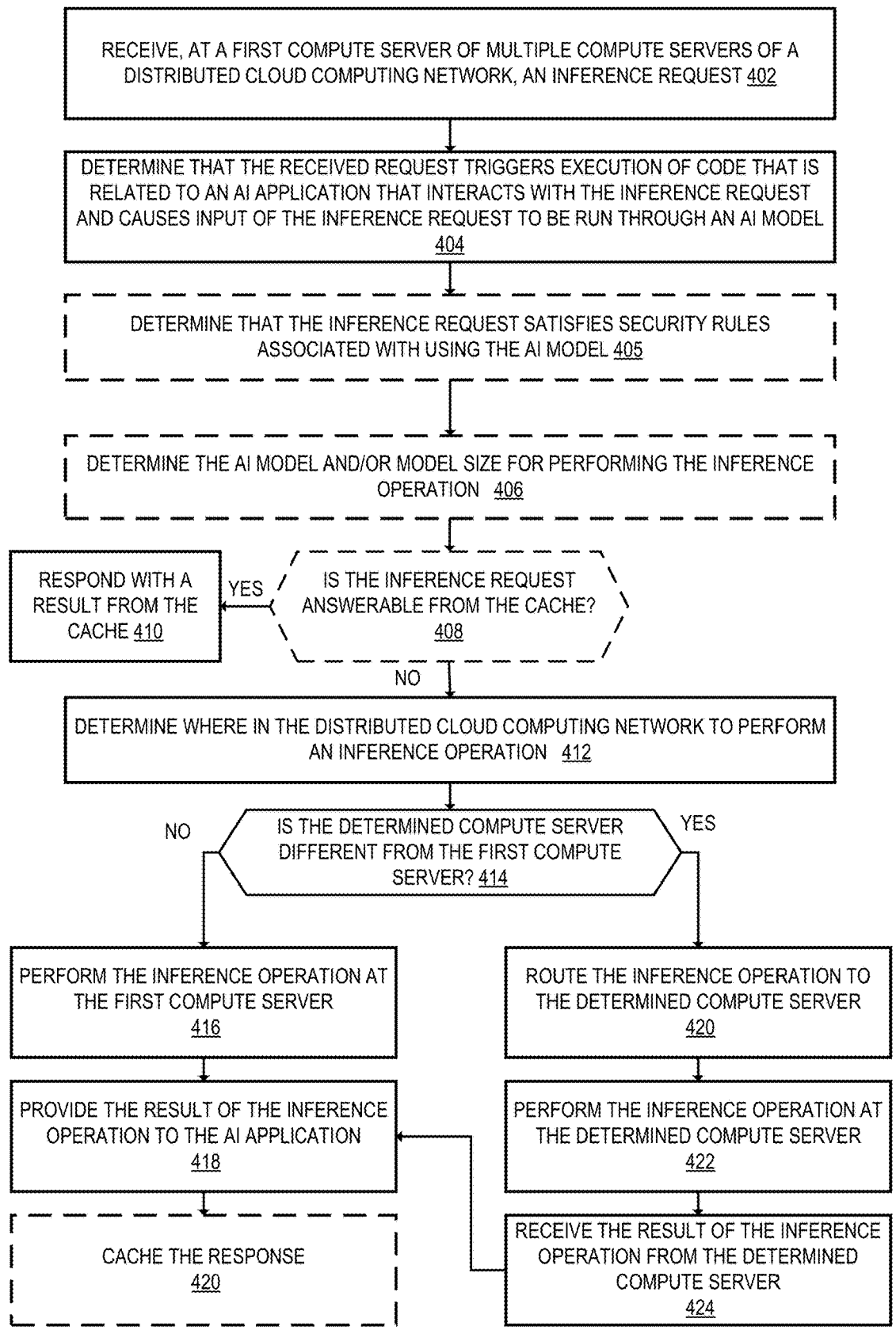
FIG. 4 is a flow diagram that illustrates exemplary operations for processing inference requests at a distributed cloud computing network according to an embodiment.

FIG. 4 is a flow diagram that illustrates exemplary operations for processing inference requests at a distributed cloud computing network according to an embodiment. The operations of FIG. 4 will be described with reference to the exemplary embodiment of FIG. 1. However, the operations of FIG. 4 can be performed by embodiments other than those discussed with reference to FIG. 1, and the embodiments discussed with reference to FIG. 1 can perform operations different than those discussed with reference to FIG. 4.

At operation 402, a first compute server (e.g., compute server 110A) of the compute servers 110A-N of the distributed cloud computing network 105 receives an inference request. The inference request includes input or a reference to input that is to be provided to an AI model for performing an inference operation. Such input may include text, image(s), video(s), and/or audio.

Next, at operation 404, the first compute server determines that the received request triggers execution of code that is related to an AI application (e.g., the AI application 132) that interacts with the inference request and causes input of the inference request to be run through an AI model. The code may be third-party code written or deployed by a customer of the distributed cloud computing network and/or first-party code written or deployed by the provider of the distributed cloud computing network. The code may be part of a serverless application. The code can be, for example, a piece of JavaScript or other interpreted language, a WebAssembly (WASM) compiled piece of code, or other compiled code. In an embodiment, the code is compliant with the W3C standard ServiceWorker API. The AI application may be run in an isolated execution environment and not a virtual machine or a container. However, in other embodiments, the code is executed using a virtual machine or a container.

Next, at operation 405, which is optional in some embodiments, the compute server enforces one or more access rules to determine that access is allowed for the AI application. In some embodiments, the access rules for the AI model 171A are based on an allowlist and/or a denylist. The access rules may be based on identity-based access rules and/or non-identity based access rules applied to characteristics of the inference request. For example, an identity-based access rule may define user identifiers and email addresses or groups of email addresses that are allowed and/or not allowed access to the AI application. A non-identity based access rule is an access rule that is not based on identity of the user, such as location (e.g., geographic region such as the country of origin), device posture, time of request, type of request, IP address, multifactor authentication status, multifactor authentication type, type of device, type of client network application, whether the request is associated with a gateway agent on the client device, and/or other layer 3, layer 4, and/or layer 7 policies. If access was determined to not be allowed, then the request may be dropped.

The AI model that is used can be defined by the AI application. However, at operation 406, which is optional in some embodiments, the first compute server dynamically determines the model and/or model size for performing the inference operation. The determined model could be different from that defined by the AI application, a different parameter size model, or a quantized model, for example. To determine the model and/or model size, the model control 141 may run a draft model to classify the contents of the inference request and determine which model and/or size of model to run for the request. The draft model analyzes the input of the inference request (e.g., the text, the image content or resolution, and/or the audio or video content and complexity) to make this prediction. As an example, a customer may deploy a first model that is specialized for coding and a second model that is specialized for medical information; and the draft model can classify the inference request to either the first model or the second model. As another example, the draft model can be configured to detect whether an inference query is malicious (e.g., part of a prompt injection attack) or wasteful (e.g., part of a denial of wallet attack); and if detected, can block the inference request from being processed by the target model or processed by a smaller model. The dynamic determination of the model and/or model size consider the network and/or compute conditions of the distributed cloud computing network 105. For example, if the compute resource availability (e.g., available GPU cycles, available GPU memory, available CPU cycles, and/or available memory) is below a threshold, a smaller model may be selected by the compute server 110A; and if the compute resource availability is above a threshold, the compute server 110A can select a larger model. The first compute server 110A may determine to use a cascading model system to perform the inference operation. The cascading model system includes multiple (two or more models) with increasing sizes and accuracy (and thus increasing computation cost) as previously described.

Next, at operation 408, which is optional in some embodiments, the first compute server determines whether the inference request (with the determined model) is answerable from the cache. For example, the cache service 155 is checked for a suitable cached response. In an embodiment, the cache key is based on an exact match to the inference request. In another embodiment, a similarity matching is performed to determine if the received inference request is similar to previous inference requests. In such embodiments, a similarity setting can be provided to allow a user or administrator to configure a level of similarity desired between the inference request 160 and the previous inference requests. If the inference request is answerable from the cache, then the compute server responds with a result from the cache at operation 410. This result can be provided to the AI application 132 for structuring and sending a response. If the inference request is not answerable from the cache, then operation 412 is performed.

At operation 412, the first compute server determines where in the distributed cloud computing network 105 to perform the inference operation. The operations described in FIG. 3 can be used. At operation 414, the first compute server determines whether the determined compute server is different from the first compute server. If it is, then operation 420 is performed. If the first compute server is the same as the determined compute server, then operation 416 is performed.

At operation 416, the inference operation is performed at the first compute server. For example, a request may be made to the model server 145 running on the first compute server 110 to perform the inference operation. The request to the model server 145 includes the input and specifies the model that is to be used. In an embodiment, the model control 141 causes a smaller model to perform the inference operation while waiting for a larger model to be loaded. For instance, if an inference request is received for a model (e.g., a large model) that is not yet loaded, the model control 141 may cause the model server 145 to use a smaller model (e.g., a quantized version of the model and/or a smaller parameter version of the model) for the inference operation and cause the model server 145 to load the larger model. In an embodiment, a cascading model system is used as previously described. Next, at operation 418, the result of the inference operation is provided to the AI application. The AI application 132 can use this result for structuring and sending a response. Next, at operation 420, which is optional in some embodiments, the first compute server caches the response in the cache.

At operation 420, the first compute server routes at least the inference operation to the determined compute server. For example, the inference request is transmitted form the first compute server to the determined compute server. At operation 422, the inference operation is performed at the different compute server. For example, a request may be made to the model server 145 running on the different compute server 110 to perform the inference operation. At operation 424, the first compute server receives the result of the inference operation from the determined compute server. Operation 418 may then be performed.

As previously described, the distributed cloud computing network 105 can receive inference requests that do not trigger the execution of code such as the AI application 132. In such a case, the inference requests are processed at the inference request gateway 135.

Figure 5:
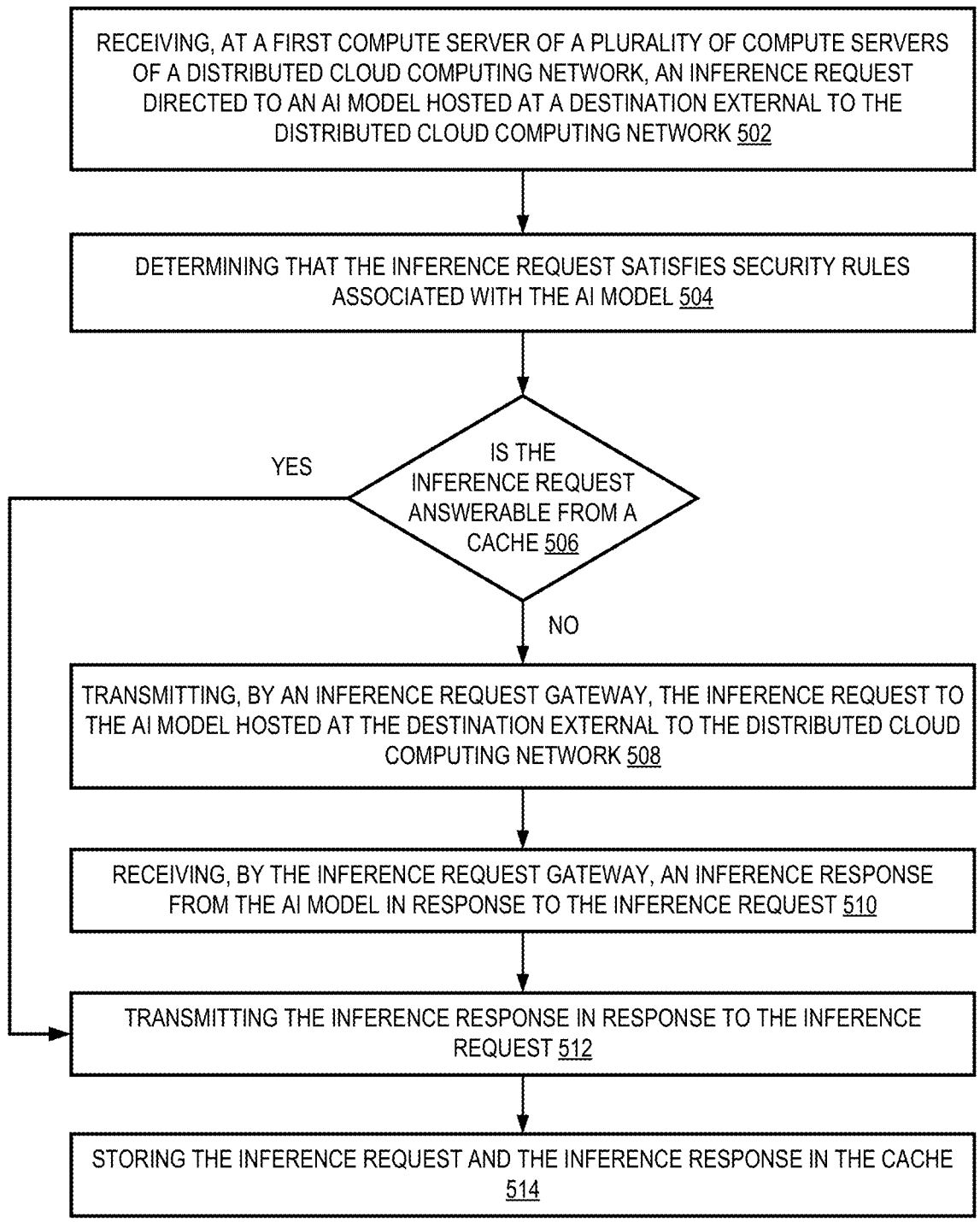
FIG. 5 is a flow diagram that illustrates exemplary operations for processing inference requests directed to AI models through a distributed cloud computing network, according to an embodiment.

FIG. 5 is a flow diagram that illustrates exemplary operations for processing inference requests directed to AI models through a distributed cloud computing network according to an embodiment. The operations of FIG. 5 will be described with reference to the exemplary embodiment of FIG. 1. However, the operations of FIG. 5 can be performed by embodiments other than those discussed with reference to FIG. 1, and the embodiments discussed with reference to FIG. 1 can perform operations different than those discussed with reference to FIG. 5. The operations of FIG. 5 are described as being performed by a compute server (e.g., one of compute servers 110A-N) that is part of a distributed cloud computing network (e.g., distributed cloud computing network 105).

In operation 502, a first compute server 110A of a plurality of compute servers 110A-N of a distributed cloud computing network 105, receives an inference request 160 directed to an AI model (e.g., one of AI models 170) hosted at a destination external to the distributed cloud computing network 105. In one embodiment, the first compute server 110A receives the inference request 160 from a client device. The inference request 160 can include a target AI model (e.g., AI model 171A).

In operation 504, a security service 115 determines that the inference request 160 satisfies security rules associated with using the AI model 171A. In one embodiment, the security service 115 is configured to enforce security rules 161, including access rules. In some embodiments, the access rules for the AI model 171A are based on an allowlist and/or a denylist. The access rules may be based on identity-based access rules and/or non-identity based access rules applied to characteristics of the inference request 160. In some embodiments, the security service 115 analyzes the inference request 160 to determine the characteristics. For example, an identity-based access rule may define user identifiers and email addresses or groups of email addresses that are allowed and/or not allowed to use the AI model specified in the inference request 160. A non-identity based access rule is an access rule that is not based on identity of the user, such as location (e.g., geographic region such as the country of origin), device posture, time of request, type of request, IP address, multifactor authentication status, multifactor authentication type, type of device, type of client network application, whether the request is associated with a gateway agent on the client device, and/or other layer 3, layer 4, and/or layer 7 policies.

In some embodiments, the security service 115 can also enforce data loss prevention (DLP) rules to prevent or mitigate the exposure of sensitive information (e.g., personal information, company information, etc.). In such embodiments, the inference request 160 can be analyzed to identify information that is potentially sensitive by matching contents of the inference request to known formats of sensitive information, including social security numbers, credit numbers, account numbers, passwords, phone numbers, addresses, etc. The security service 115 can identify sensitive information by matching customer-defined keywords, password character/length requirements, and/or analyzing field names. In some embodiments, when the security service 115 identifies sensitive information, the sensitive information in the inference request 160 can be redacted or obfuscated, or the inference request 160 flagged as including sensitive information or blocked entirely.

When the inference request 160 satisfies the security rules associated with the AI model 171A, an inference request control 120 can determine that the target AI model (e.g., AI model 171A) is located at a destination external to the distributed cloud computing network 105 (e.g., not an internal AI model). In response to the determination, the inference request control 120 can direct the inference request to an inference request gateway 135. In some embodiments, the inference request 160 can be directed to the inference request gateway 135 to determine whether the target AI model is external or internal to the distributed cloud computing network 105.

In some embodiments, where the inference request does not indicate a specific AI model, the inference request control 120 can automatically determine an appropriate AI model for responding to the inference request 160. In one embodiment, a draft AI model can be executed in the first compute server 110A to classify the contents of the inference request 160. For example, the draft AI model can process text input, image content or resolution, audio and/or video content complexity, and other contents of the inference request 160. Based on the processing, the draft AI model can identify one or more appropriate AI models that can be queried based on determining whether a low or high parameter AI model should be used, whether a quantized model should be used, etc.

In operation 506, the inference request gateway 135 determines if the inference request 160 is answerable from a cache. In some embodiments, the inference request gateway 135 performs a cache check to a cache service 155. The cache service 155 can include a cached distributed data store 157 storing previous inference requests and any corresponding inference responses. In one embodiment, the cached distributed data store 157 is a key-value store that stores a hash of previous inference queries with corresponding inference responses as key-value pairs.

The cached distributed data store 157 may be stored on each of the compute servers 110A-N or at least some of the compute servers 110A-N. The contents of the cached distributed data store 157 may be different on different ones of the compute servers 110A-N. For instance, it is possible for a cached distributed data store 157 on a first compute server to have inference request and response pairs and a cached distributed data store 157 on a second compute server having no inference request and response pairs or different inference request and response pairs.

In some embodiments, the cache service 155 stores inference request and response pairs in the cached distributed data store 157 up through a TTL, where upon expiration of the TTL, those inference request and response pairs are subject to removal from the cached distributed data store 157. In one embodiment, the TTL for the storing of inference request and response pairs is set at a default of two weeks. In other embodiments, inference requests and responses are stored in the cached distributed data store 157 until the cache service 155 receives a notification or indication that the AI model that generated the inference response is updated.

In some embodiments, the cache check determines if an exact match to the inference request 160 is stored in the cached distributed data store 157. In other embodiments, the cache check performs a similarity matching to determine if the inference request 160 is similar to previous inference requests stored in the cached distributed data store 157. In such embodiments, a similarity setting can be provided to allow a user or administrator to configure a level of similarity desired between the inference request 160 and the previous inference requests. In other embodiments, the cache check can identify previous inference requests that have a similar format from a same or similar application to the inference request 160.

When the inference request 160 is answerable from the cache, the inference response is retrieved from the cached distributed data store 157, and the operations proceed to operation 512. When the inference request 160 is not answerable from the cached distributed data store 157, the operations proceed to operation 508.

In operation 508, the inference request gateway 135 transmits the inference request 164 to the AI model 171A hosted at the destination external to the distributed cloud computing network 105. In one embodiment, the AI model 171A is one of a plurality of AI models 170 hosted on an external server or multiple external servers.

In some embodiments, the inference request gateway 135 can determine that instead of sending the inference request 164 directly from the inference request gateway 135, the inference request 164 should be sent to another compute server (e.g., a second compute server 110B of the plurality of compute servers 110A-N of the distributed cloud computing network 105) for optimal performance of the inference operation, which then can send the inference request 164 to the destination external to the distributed cloud computing network 105.

In operation 510, the inference request gateway 135 receives an inference response 165 from the AI model 171A in response to the inference request 164. In some embodiments, the inference response 165 is provided through response streaming, whereby the inference request gateway 135 receives the inference response 165 as it is produced by the AI model 171A, instead of receiving the inference response as a single payload.

In some scenarios, the inference operation may fail (e.g., the AI model 171A was unable to generate a response or an acceptable response). For example, the inference response may be a NULL, indicating no response, may not match an expected response, or may be an incomplete response. In response, the inference request gateway 135 can transmit the inference request 164 to a fallback AI model. In some embodiments, the initial inference request 160 can include one or more fallback AI models. In other embodiments, a fallback AI model can be determined automatically (as described above by a draft AI model in the first compute server 110A). The inference request gateway 135 may be configured to translate the inference request 164 from a format suitable for the target AI model (e.g., AI model 171A) to a format suitable for the fallback AI model.

In operation 512, the proxy server transmits the inference response in response to the inference request. For example, the inference response 165 can be transmitted to the client device that provided the inference request 160.

In operation 514, the inference request gateway 135 performs an update cache operation to store the inference request and response pair in the cached distributed data store 157. In some embodiments, the cache service 155 generates a cache key (e.g., by generating a hash of the inference request 164) and stores the inference response 165 with the cache key as a key-value pair. In some embodiments, the cache key can further include an account identifier and/or the AI model used to generate the inference response.

The inference request and response operation may be logged. As an example, the inference request gateway 135 may log one or more of the following: the user/customer, the time of the inference request, the provider, the AI model queried, the inference request payload, the inference response payload, the status, cached status, the number of tokens in, and the number of tokens out.

Figure 6:
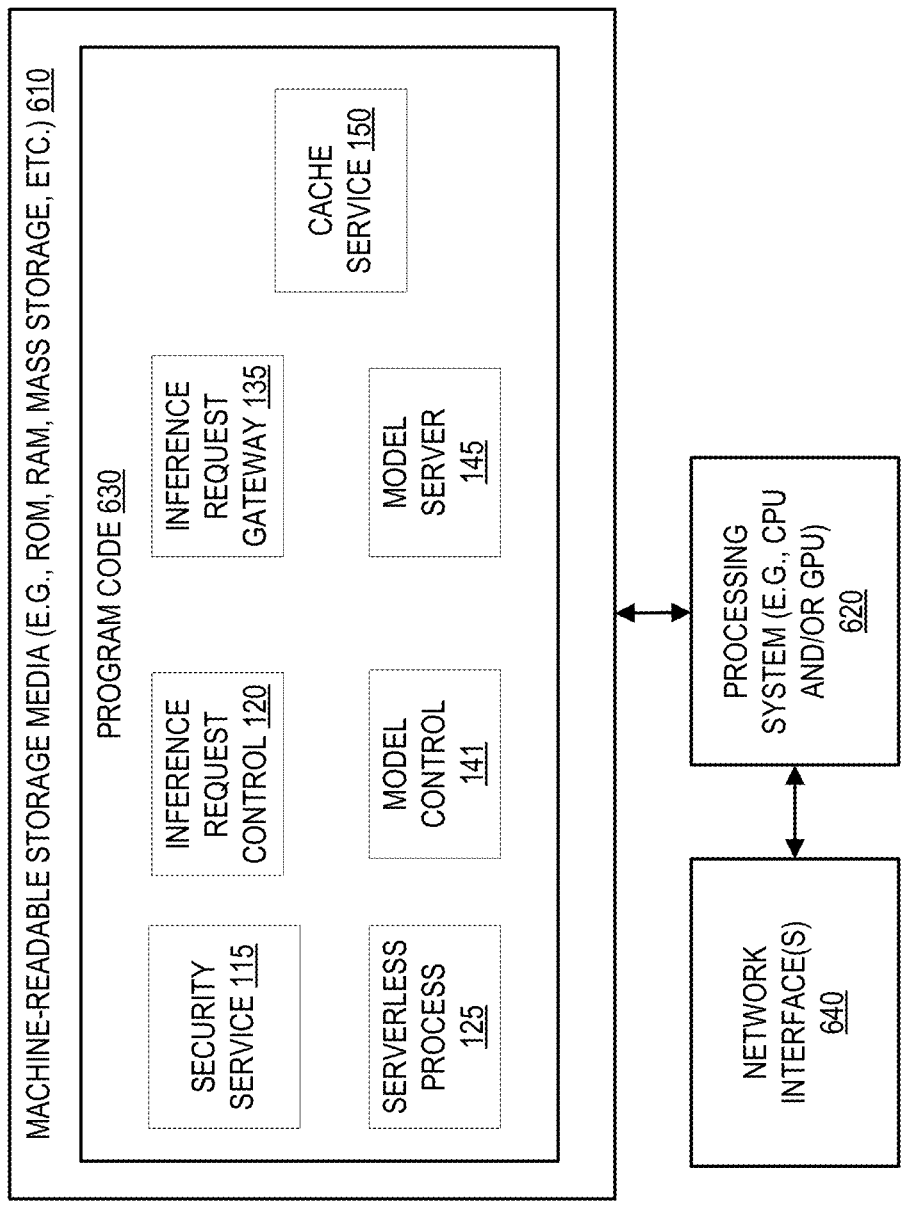
FIG. 6 illustrates a block diagram for an exemplary data processing system that may be used in some embodiments.

FIG. 6 illustrates a block diagram for an exemplary data processing system 600 that may be used in some embodiments. One or more such data processing systems 600 may be utilized to implement the embodiments and operations described with respect to the compute servers. The data processing system 600 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 610 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 620. The processing system 620 can include CPU(s), GPU(s), and/or other processors. For example, the depicted machine-readable storage media 610 may store program code 630 that, when executed by the processing system 620, causes the data processing system 600 to execute the security service 115, inference request control 120, serverless process 125, inference request gateway 135, model control 141, model server 145, and/or the cache service 155, and/or any of the operations described herein. The data processing system 600 also includes one or more network interfaces 640 (e.g., a wired and/or wireless interfaces) that allows the data processing system 600 to transmit data and receive data from other computing devices, typically across one or more networks (e.g., Local Area Networks (LANs), the Internet, etc.). Additional components, not shown, may also be part of the system 600, and, in certain embodiments, fewer components than that shown. One or more buses may be used to interconnect the various components shown in FIG. 6.

The techniques shown in the figures can be implemented using code and data stored and executed on one or more electronic devices (e.g., a client device, a compute server, a control server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

In the preceding description, numerous specific details are set forth to provide a more thorough understanding. However, embodiments may be practiced without such specific details. In other instances, full software instruction sequences have not been shown in detail to not obscure understanding. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a first compute server of a plurality of compute servers of a distributed cloud computing network, comprising:

receiving a first inference request directed to a first AI model of a plurality of AI models that are each hosted at different destinations external to the distributed cloud computing network, wherein at least some of the plurality of AI models are provided by different third-party providers, wherein the first inference request is received at the first compute server of the distributed cloud computing network instead of a first server of a first third-party provider that hosts the first AI model as a result of a first endpoint for the first AI model pointing to the distributed cloud computing network instead of to the first third-party provider, and wherein the first endpoint for the first AI model identifies the first third-party provider and an account;

applying a rate limiting rule to the first inference request, the rate limiting rule to prevent excessive or suspicious inference requests targeting the first AI model to be transmitted to the first AI model, wherein the first inference request complies with the rate limiting rule;

accessing, based on a hash key generated from the first inference request, a distributed data store of the distributed cloud computing network that stores representations of previous inference requests with corresponding inference responses for the first AI model as key-value pairs, wherein the hash key generated from the first inference request does not have a matching key-value pair in the distributed data store;

transmitting the first inference request to the first AI model responsive to not finding a matching key-value pair in the distributed data store for the hash key generated from the first inference request;

receiving a first inference response from the first AI model in response to the transmitted first inference request;

transmitting the first inference response in response to the first inference request; storing the hash key generated from the first inference request and the first inference response as a key-value pair in the distributed data store;

causing information about the first inference request and the first inference response to be logged including information that identifies: the first AI model, the first third-party provider, whether the first inference response was served from the distributed data store, a first number of tokens in, and a first number of tokens out;

receiving a second inference request directed to a second AI model of the plurality of AI models, wherein the first AI model and the second AI model are provided by different third-party providers, wherein the second inference request is received at the first compute server of the distributed cloud computing network instead of a second server of a second third-party provider that hosts the second AI model as a result of a second endpoint for the second AI model pointing to the distributed cloud computing network instead of to the second third-party provider, and wherein the second endpoint for the second AI model identifies the second third-party provider and the account;

applying a second rate limiting rule to the second inference request, the second rate limiting rule to prevent excessive or suspicious inference requests targeting the second AI model to be transmitted to the second AI model, wherein the second inference request complies with the second rate limiting rule;

accessing, based on a hash key generated from the second inference request, a distributed data store of the distributed cloud computing network that stores representations of previous inference requests with corresponding inference responses for the first AI model as key-value pairs, wherein the hash key generated from the first inference request has a matching key-value pair in the distributed data store;

retrieving a second inference response of the matching key-value pair in the distributed data store;

transmitting the second inference response in response to the second inference request; and causing information about the second inference request and the second inference response to be logged including information that identifies: the second AI model, the second third-party provider, whether the second inference response was served from the distributed data store, a second number of tokens in, and a second number of tokens out, wherein the logged information about the first inference request and the first inference response and the logged information about the second inference request and the second inference response are used in an analytics service provided by the distributed cloud computing network that aggregates the logged information for the account.

2. The method of claim 1, further comprising:
determining characteristics of the first inference request; and
applying one or more access rules to the determined characteristics of the first inference request, wherein the one or more access rules include one or more identity-based rules and one or more non-identity based rules.

3. The method of claim 1, wherein transmitting the first inference request to the first AI model includes:
identifying a second compute server of the distributed cloud computing network; and
transmitting the first inference request to the second compute server for transmitting the first inference request to the first AI model.

4. The method of claim 1, further comprising:
receiving a third inference request that does not indicate a specific one of the plurality of AI models;
executing a classifier AI model;
processing, by the classifier AI model, contents of the third inference request;
determining which one of the plurality of AI models is to service the third inference request based on the processing of the contents of the third inference request;

transmitting the third inference request to the determined one of the plurality of AI models;
receiving a third inference response from the determined one of the plurality of AI models in response to the transmitted third inference request; and
transmitting the third inference response in response to the third inference request.

5. The method of claim 1, further comprising:
determining the first inference request includes potentially sensitive information; and
enforcing data loss prevention rules to the first inference request by obfuscating the potentially sensitive information prior to transmitting the first inference request to the first AI model.

6. The method of claim 1, further comprising:
determining that the first inference response from the first AI model is incomplete;
identifying a fallback AI model for responding to the first inference response; and
transmitting the first inference request to the fallback AI model.

7. A non-transitory machine-readable storage medium that provides instructions that, if executed by a processor will cause a first compute server of a plurality of compute servers of a distributed cloud computing network to perform operations including:
receiving a first inference request directed to a first AI model of a plurality of AI models that are each hosted at different destinations external to the distributed cloud computing network, wherein at least some of the plurality of AI models are provided by different third-party providers, wherein the first inference request is received at the first compute server of the distributed cloud computing network instead of a first server of a first third-party provider that hosts the first AI model as a result of a first endpoint for the first AI model pointing to the distributed cloud computing network instead of to the first third-party provider, and wherein the first endpoint for the first AI model identifies the first third-party provider and an account;

applying a rate limiting rule to the first inference request, the rate limiting rule to prevent excessive or suspicious inference requests targeting the first AI model to be transmitted to the first AI model, wherein the first inference request complies with the rate limiting rule;

accessing, based on a hash key generated from the first inference request, a distributed data store of the distributed cloud computing network that stores representations of previous inference requests with corresponding inference responses for the first AI model as key-value pairs, wherein the hash key generated from the first inference request does not have a matching key-value pair in the distributed data store;

transmitting the first inference request to the first AI model responsive to not finding a matching key-value pair in the distributed data store for the hash key generated from the first inference request;

receiving a first inference response from the first AI model in response to the transmitted first inference request;

transmitting the first inference response in response to the first inference request;

storing the hash key generated from the first inference request and the first inference response as a key-value pair in the distributed data store;

causing information about the first inference request and the first inference response to be logged including information that identifies: the first AI model, the first third-party provider, whether the first inference response was served from the distributed data store, a first number of tokens in, and a first number of tokens out;

receiving a second inference request directed to a second AI model of the plurality of AI models, wherein the first AI model and the second AI model are provided by different third-party providers, wherein the second inference request is received at the first compute server of the distributed cloud computing network instead of a second server of a second third-party provider that hosts the second AI model as a result of a second endpoint for the second AI model pointing to the distributed cloud computing network instead of to the second third-party provider, and wherein the second endpoint for the second AI model identifies the second third-party provider and the account;

applying a second rate limiting rule to the second inference request, the second rate limiting rule to prevent excessive or suspicious inference requests targeting the second AI model to be transmitted to the second AI model, wherein the second inference request complies with the second rate limiting rule;

accessing, based on a hash key generated from the second inference request, a distributed data store of the distributed cloud computing network that stores representations of previous inference requests with corresponding inference responses for the first AI model as key-value pairs, wherein the hash key generated from the first inference request has a matching key-value pair in the distributed data store;

retrieving a second inference response of the matching key-value pair in the distributed data store;

transmitting the second inference response in response to the second inference request; and causing information about the second inference request and the second inference response to be logged including information that identifies: the second AI model, the second third-party provider, whether the second inference response was served from the distributed data store, a second number of tokens in, and a second number of tokens out, wherein the logged information about the first inference request and the first inference response and the logged information about the second inference request and the second inference response are used in an analytics service provided by the distributed cloud computing network that aggregates the logged information for the account.

8. The non-transitory machine-readable storage medium of claim 7, wherein the operations further include:
determining characteristics of the first inference request; and
applying one or more access rules to the determined characteristics of the first inference request, wherein the one or more access rules include one or more identity-based rules and one or more non-identity based rules.

9. The non-transitory machine-readable storage medium of claim 7, wherein transmitting the first inference request to the first AI model includes:
identifying a second compute server of the distributed cloud computing network; and
transmitting the first inference request to the second compute server for transmitting the first inference request to the first AI model.

10. The non-transitory machine-readable storage medium of claim 7, wherein the operations further comprise:

receiving a third inference request that does not indicate a specific one of the plurality of AI models,
executing a classifier AI model;
processing, by the classifier AI model, contents of the third inference request;
determining which one of the plurality of AI models is to service the third inference request based on the processing of the contents of the third inference request;
transmitting the third inference request to the determined one of the plurality of AI models;
receiving a third inference response from the determined one of the plurality of AI models in response to the transmitted third inference request; and
transmitting the third inference response in response to the third inference request.

11. The non-transitory machine-readable storage medium of claim 7, wherein the operations further comprise:
determining the first inference request includes potentially sensitive information; and
enforcing data loss prevention rules to the first inference request by obfuscating the potentially sensitive information prior to transmitting the first inference request to the first AI model.

12. The non-transitory machine-readable storage medium of claim 7, wherein the operations further comprise:
determining that the first inference response from the first AI model is incomplete;
identifying a fallback AI model for responding to the first inference response; and
transmitting the first inference request to the fallback AI model.

13. A first compute server, wherein the first compute server is one of a plurality of compute servers of a distributed cloud computing network, the first compute server comprising:
a processing system; and
a non-transitory machine-readable storage medium that provides instructions that when executed by the processing system, will cause the first compute server to perform operations including:
receiving a first inference request directed to a first AI model of a plurality of AI models that are each hosted at different destinations external to the distributed cloud computing network, wherein at least some of the plurality of AI models are provided by different third-party providers, wherein the first inference request is received at the first compute server of the distributed cloud computing network instead of a first server of a first third-party provider that hosts the first AI model as a result of a first endpoint for the first AI model pointing to the distributed cloud computing network instead of to the first third-party provider, and wherein the first endpoint for the first AI model identifies the first third-party provider and an account,
applying a rate limiting rule to the first inference request, the rate limiting rule to prevent excessive or suspicious inference requests targeting the first AI model to be transmitted to the first AI model, wherein the first inference request complies with the rate limiting rule,
accessing, based on a hash key generated from the first inference request, a distributed data store of the distributed cloud computing network that stores representations of previous inference requests with corresponding inference responses for the first AI model as key-value pairs, wherein the hash key generated from the first inference request does not have a matching key-value pair in the distributed data store, transmitting first inference request to the first AI model responsive to not finding a matching key-value pair in the distributed data store for the hash key generated from the first inference request, receiving a first inference response from the first AI model in response to the transmitted first inference request, transmitting the first inference response in response to the first inference request, storing the hash key generated from the first inference request and the first inference response as a key-value pair in the distributed data store, causing information about the first inference request and the first inference response to be logged including information that identifies: the first AI model, the first third-party provider, whether the first inference response was served from the distributed data store, a first number of tokens in, and a first number of tokens out, receiving a second inference request directed to a second AI model of the plurality of AI models, wherein the first AI model and the second AI model are provided by different third-party providers, wherein the second inference request is received at the first compute server of the distributed cloud computing network instead of a second server of a second third-party provider that hosts the second AI model as a result of a second endpoint for the second AI model pointing to the distributed cloud computing network instead of to the second third-party provider, and wherein the second endpoint for the second AI model identifies the second third-party provider and the account, applying a second rate limiting rule to the second inference request, the second rate limiting rule to prevent excessive or suspicious inference requests targeting the second AI model to be transmitted to the second AI model, wherein the second inference request complies with the second rate limiting rule, accessing, based on a hash key generated from the second inference request, a distributed data store of the distributed cloud computing network that stores representations of previous inference requests with corresponding inference responses for the first AI model as key-value pairs, wherein the hash key generated from the first inference request has a matching key-value pair in the distributed data store, retrieving a second inference response of the matching key-value pair in the distributed data store, transmitting the second inference response in response to the second inference request, and causing information about the second inference request and the second inference response to be logged including information that identifies: the second AI model, the second third-party provider, whether the second inference response was served from the distributed data store, a second number of tokens in, and a second number of tokens out, wherein the logged information about the first inference request and the first inference response and the logged information about the second inference request and the second inference response are used in an analytics service provided by the distributed cloud computing network that aggregates the logged information for the account.

14. The first compute server of claim 13, wherein the operations further include:
  determining characteristics of the first inference request; and
  applying one or more access rules to the determined characteristics of the first inference request, wherein the one or more access rules include one or more identity-based rules and one or more non-identity based rules.

15. The first compute server of claim 13, wherein transmitting the first inference request to the first AI model includes:
  identifying a second compute server of the distributed cloud computing network; and
  transmitting the first inference request to the second compute server for transmitting the first inference request to the first AI model.

16. The first compute server of claim 13, wherein the operations further comprise:
  receiving a third inference request that does not indicate a specific one of the plurality of AI models,
  executing a classifier AI model,
  processing, by the classifier AI model, contents of the third inference request,
  determining which one of the plurality of AI models is to service the third inference request based on the processing of the contents of the third inference request,
  transmitting the third inference request to the determined one of the plurality of AI models,
  receiving a third inference response from the determined one of the plurality of AI models in response to the transmitted third inference request, and
  transmitting the third inference response in response to the third inference request.

17. The first compute server of claim 13, wherein the operations further comprise:
  determining first inference request includes potentially sensitive information; and
  enforcing data loss prevention rules to the first inference request by obfuscating the potentially sensitive information prior to transmitting the first inference request to the first AI model.

18. The first compute server of claim 13, wherein the operations further comprise:
  determining that the first inference response from the first AI model is incomplete;
  identifying a fallback AI model for responding to the first inference response; and
  transmitting the first inference request to the fallback AI model.

* * * * *